(12) United States Patent
Wang

(10) Patent No.: US 8,472,434 B2
(45) Date of Patent: Jun. 25, 2013

(54) CIRCUIT SERVICE TUNNELING SYSTEMS, METHODS, AND INTERWORKING SYSTEMS AND MOBILITY MANAGEMENT ENTITIES THEREOF

(75) Inventor: Guotong Wang, Beijing (CN)

(73) Assignee: Via Telecom, Inc., San Diego, CA (US)

( * ) Notice: Subject to any disclaimer, the term of this patent is extended or adjusted under 35 U.S.C. 154(b) by 426 days.

(21) Appl. No.: 12/775,521

(22) Filed: May 7, 2010

(65) Prior Publication Data
US 2010/0290436 A1    Nov. 18, 2010

Related U.S. Application Data

(60) Provisional application No. 61/177,660, filed on May 13, 2009.

(51) Int. Cl.
*H04L 12/66* (2006.01)
(52) U.S. Cl.
USPC ........................................ 370/352; 370/395.2
(58) Field of Classification Search
USPC ................. 370/352, 353, 354, 355, 356, 357, 370/395.2
See application file for complete search history.

(56) References Cited

U.S. PATENT DOCUMENTS

| | | | |
|---|---|---|---|
| 2009/0016300 A1* | 1/2009 | Ahmavaara et al. | 370/331 |
| 2009/0086674 A1* | 4/2009 | Ejzak | 370/331 |
| 2010/0097990 A1* | 4/2010 | Hallenstal et al. | 370/328 |
| 2010/0135246 A1* | 6/2010 | Hallental | 370/331 |
| 2010/0260105 A1* | 10/2010 | Keller et al. | 370/328 |
| 2010/0284333 A1* | 11/2010 | Shirota et al. | 370/328 |
| 2010/0290436 A1* | 11/2010 | Wang | 370/335 |
| 2011/0013598 A1* | 1/2011 | Jang et al. | 370/331 |
| 2011/0080867 A1* | 4/2011 | Mildh | 370/328 |
| 2011/0200011 A1* | 8/2011 | Rune | 370/331 |

* cited by examiner

*Primary Examiner* — Kwang B Yao
*Assistant Examiner* — Nguyen Ngo
(74) *Attorney, Agent, or Firm* — McClure, Qualey & Rodack, LLP

(57) ABSTRACT

A circuit service tunneling system is provided. The circuit service tunneling system has a first and a second mobile service network, and a user equipment. The first mobile service network provides packet-switched domain services and the second mobile service network provides circuit-switched domain services. An interworking system in the second mobile service network interconnects the first mobile service network with the second mobile service network, by connecting to a mobility management entity in the first mobile service network, to enable the first mobile service network to provide the circuit-switched domain service to the user equipment via the second mobile service network.

13 Claims, 5 Drawing Sheets

CIRCUIT SERVICE TUNNELING SYSTEMS, METHODS, AND INTERWORKING SYSTEMS AND MOBILITY MANAGEMENT ENTITIES THEREOF

CROSS REFERENCE TO RELATED APPLICATIONS

This Application claims the benefit of U.S. Provisional Application No. 61/177,660, filed on May 13, 2009, the entirety of which is incorporated by reference herein.

BACKGROUND OF THE INVENTION

1. Field of the Invention

The invention generally relates to communications in the Circuit Switched Fall-Back (CSFB) architecture, and more particularly, to circuit service tunneling systems, methods, and interworking systems and mobility management entities thereof, which conform to the CSFB architecture.

2. Description of the Related Art

With growing demand for mobile communications, the Global System for Mobile communications (GSM) supporting only circuit-switched (CS) domain services no longer meets user requirements. The mobile communications working groups and standard groups accordingly have developed the so-called third generation mobile communications technologies, such as Wideband Code Division Multiple Access (W-CDMA), Code Division Multiple Access-2000 (CDMA-2000), Time Division-Synchronous Code Division Multiple Access (TDSCDMA), etc. Take the Universal Mobile Telecommunications System (UMTS) using the W-CDMA technology for example, the 3rd Generation Partnership Project (3GPP) has further proposed the Long Term Evolution (LTE) system, also called the fourth generation mobile communications system, to be implemented to meet future demand for large wireless data transmission bandwidths. The LTE system aims to provide an all-IP architecture, in which only packet-switched (PS) domain instead of CS domain is used to carry all mobile communications services. Also, voice services are provided by Voice over Internet Protocol (VoIP) in the fourth generation mobile communications system, instead of the CS domain of the third generation mobile communications system.

However, during transition from the third generation mobile communications system to the fourth generation mobile communications system, some operators have still chosen to provide voice services via the CS domain of the third generation mobile communications system, due to the situation that the coverage rate and capacity of the CS domain of the third generation mobile communications system are already sufficient. A problem is raised for that the architecture of the third generation mobile communications system comprises both CS domain and PS domain while the fourth generation mobile communications system comprises only PS domain. Accordingly, the interconnection between the third generation mobile communications system and the fourth generation mobile communications system, especially the CS domain part, must be defined and specified, so that systems of different standards can smoothly interwork to provide voice services to users. One technique used is the CSFB architecture, which is defined in the 3GPP TS 23.272 specification.

It is noted that, in the interconnection between the LTE system and the CDMA-2000 system, the 1x Link Access Control (1x LAC) layer of the CDMA-2000 protocol stack processes logical channels with a specific mapping relationship between the channels. Consequently, the 1x LAC layer in the CDMA-2000 system does not provide logical channel indication information and the CDMA-2000 system does not provide information of the logical channel used for transmitting signaling messages of the 1x LAC layer. In the current CSFB architecture, upon receiving a signaling message of the 1x LAC layer from the CDMA-2000 system, the 1x LAC layer in the LTE system can not obtain correct logical channel information to process the signaling messages of the 1x LAC layer. In addition, the 1x 2nd layers in the current CSFB architecture do not have an acknowledgement mechanism to ensure the delivery of some signaling messages of the 1x LAC layer, e.g. the registration messages. Thus, a method is needed to correctly interconnect the LTE system and the CDMA-2000 system operating in the CSFB architecture.

BRIEF SUMMARY OF THE INVENTION

Accordingly, embodiments of the invention provide circuit service tunneling systems, methods, and interworking systems and mobility management entities thereof. In one aspect of the invention, a circuit service tunneling system is provided. The circuit service tunneling system comprises a first mobile service network, a second mobile service network, an interworking system, and a user equipment. The first mobile service network provides packet-switched (PS) domain services. The second mobile service network provides circuit-switched (CS) domain services. The interworking system comprises a circuit-service tunneling protocol (CSTP) and connects to the first and second mobile service networks to enable the first mobile service network to provide the CS domain services via the second mobile service network. The user equipment supports a first communication protocol corresponding to the first mobile service network, a second communication protocol corresponding to a CS domain of the second mobile service network, and the circuit-service tunneling protocol (CSTP), and connects to the first mobile service network, wherein one of the interworking system and the user equipment encapsulates CS domain service data in a circuit-service tunneling message conforming to the circuit-service tunneling protocol and transmits the circuit-service tunneling message to the other of the interworking system and the user equipment, and the other of the interworking system and the user equipment decapsulates the circuit-service tunneling message according to the circuit-service tunneling protocol to obtain the CS domain service data.

In another aspect of the invention, an interworking system is provided. The interworking system connects to a first mobile service network and a mobility management entity of a second mobile service network to enable the second mobile service network to provide CS domain services via the first mobile service network, wherein the first mobile service network provides CS domain services and the second mobile service network provides PC domain services. The interworking system comprises a link access control module, a circuit service tunneling module, and a cross-system interface module. The link access control module receives CS domain service data to be transmitted, transmits a data ready request, and transmits the CS domain service data in a data request upon receiving an availability indication. The circuit service tunneling module determines whether a channel is available upon receiving the data ready request, transmits the availability indication in response to determining that a channel is available, and encapsulates the CS domain service data in a circuit-service tunneling message conforming to a circuit service tunneling protocol upon receiving the data request. The cross-system interface module converts the circuit-service tunneling message into a message format recognizable to the first and second mobile service networks, and transmits the circuit-service tunneling message in the message format via the second mobile service network.

In another aspect of the invention, a circuit service tunneling method for an interworking system is provided. The interworking system connects to a first mobile service network and a second mobile service network to enable the second mobile service network to provide CS domain services to a user equipment via the first mobile service network. The second mobile service network provides PC domain services. The user equipment supports a first communication protocol corresponding to a CS domain of the first mobile service network, a second communication protocol corresponding to the second mobile service network, and a circuit-service tunneling protocol (CSTP). The circuit service tunneling method comprises encapsulating CS domain service data in a circuit-service tunneling message conforming to the circuit-service tunneling protocol, converting the circuit-service tunneling message into a message format recognizable to the first and second mobile service networks, and transmitting the circuit-service tunneling message in the message format to the user equipment via the second mobile service network, wherein the user equipment decapsulates the circuit-service tunneling message in the message format according to the circuit-service tunneling protocol to obtain the CS domain service data.

In another aspect of the invention, a mobility management entity is provided. The mobility management entity, locates and connects to, in a first mobile service network, an interworking system in a second mobile service network to interconnect the first and second mobile service networks and enable the first mobile service network to provide CS domain services via the second mobile service network. The first mobile service network provides PS domain services and the second mobile service network provides CS domain services. The mobility management entity comprises a cross-system interface module and a mobility management interface module. The cross-system interface module receives an air interface message from the interworking system, wherein the air interface message comprises a circuit-service tunneling message that was converted to a first format by the interworking system. The mobility management interface module converts the circuit-service tunneling message from the first format to a second format conforming to a base station system of the first mobile service network, and transmits the converted circuit-service tunneling message in the second format to the user equipment via the base station system.

Other aspects and features of the invention will become apparent to those ordinarily skilled in the art upon review of the following descriptions of specific embodiments of circuit service tunneling systems, methods, and interworking systems and mobility management entities thereof, which conform to the CSFB architecture.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
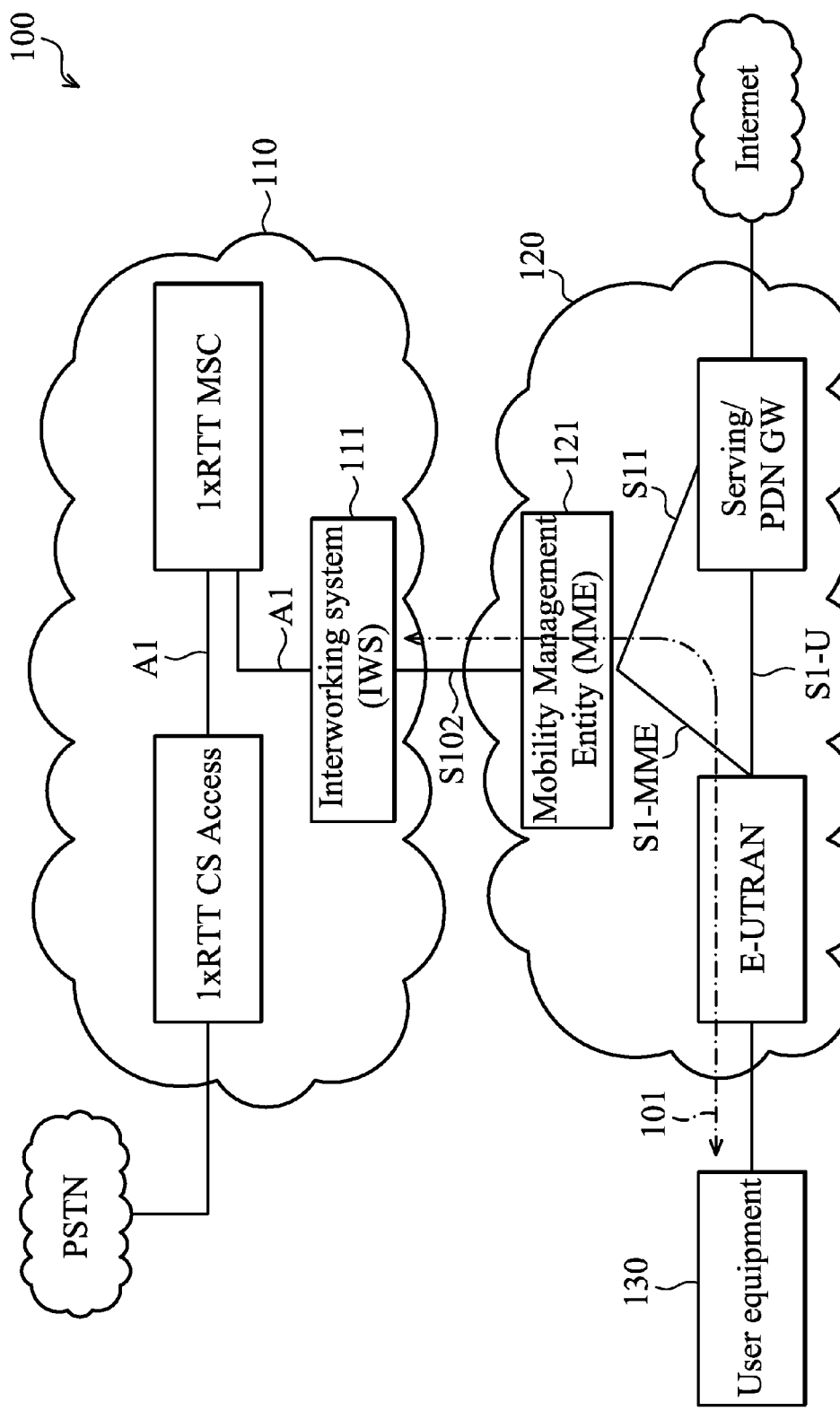
FIG. 1 is a block diagram illustrating a system operating in the CSFB architecture according to an embodiment of the invention.

The invention provides a method to correctly interconnect an LTE system and a CDMA-2000 system operating in the Circuit Switched FallBack (CSFB) architecture. FIG. 1 is a block diagram illustrating a system operating in the CSFB architecture according to an embodiment of the invention. In a circuit service tunneling system 100, a third generation mobile communications system, a CDMA-2000 system 110, coexists with a fourth generation mobile communications system, an LTE system 120. A user equipment (UE) 130 supports not only the technology of the LTE system 120, but also the CS domain part of the CDMA-2000 system 110 technology. Although the area where the UE 130 is located is under the coverage of both the LTE system 120 and the CDMA-2000 system 110, the UE 130 would choose to camp on the LTE system 120 as a first priority to obtain PS services, as the LTE system 120 provides a larger data rate. As shown in FIG. 1, the CDMA-2000 system 110 and the LTE system 120 is interconnected via the interface S102 between the InterWorking System (IWS) 111 and the Mobility Management Entity (MME) 121. The description relating to the interface S102 is defined in the 3GPP TS 29.277 specification and is omitted in this specification as it is beyond the scope of the invention.

Distinct from the conventional UE and IWS, the CDMA 2000 protocol used in the UE 130 and IWS 111 of this invention further include a Circuit Service Tunneling Protocol (CSTP) layer in the CDMA-2000 protocol stack. When a voice service is requested, the UE 130 establishes a communication tunnel 101 between itself and the IWS 111 in the CDMA-2000 system 110, to interconnect the LTE system 120 with the CDMA-2000 system 110. Therefore, the LTE system 120 provides the voice service to the UE 130 via the CS domain of the CDMA-2000 system 110.

The UE 130 may be a mobile telephone (also known as cellular or cell phone), a laptop computer with wireless communication capability, a personal digital assistant (PDA), etc. In addition, the UE 130 may be portable, handheld, pocket-sized, or installed in a vehicle, and may communicate voice and/or data signals with mobile communication networks.

Figure 2:
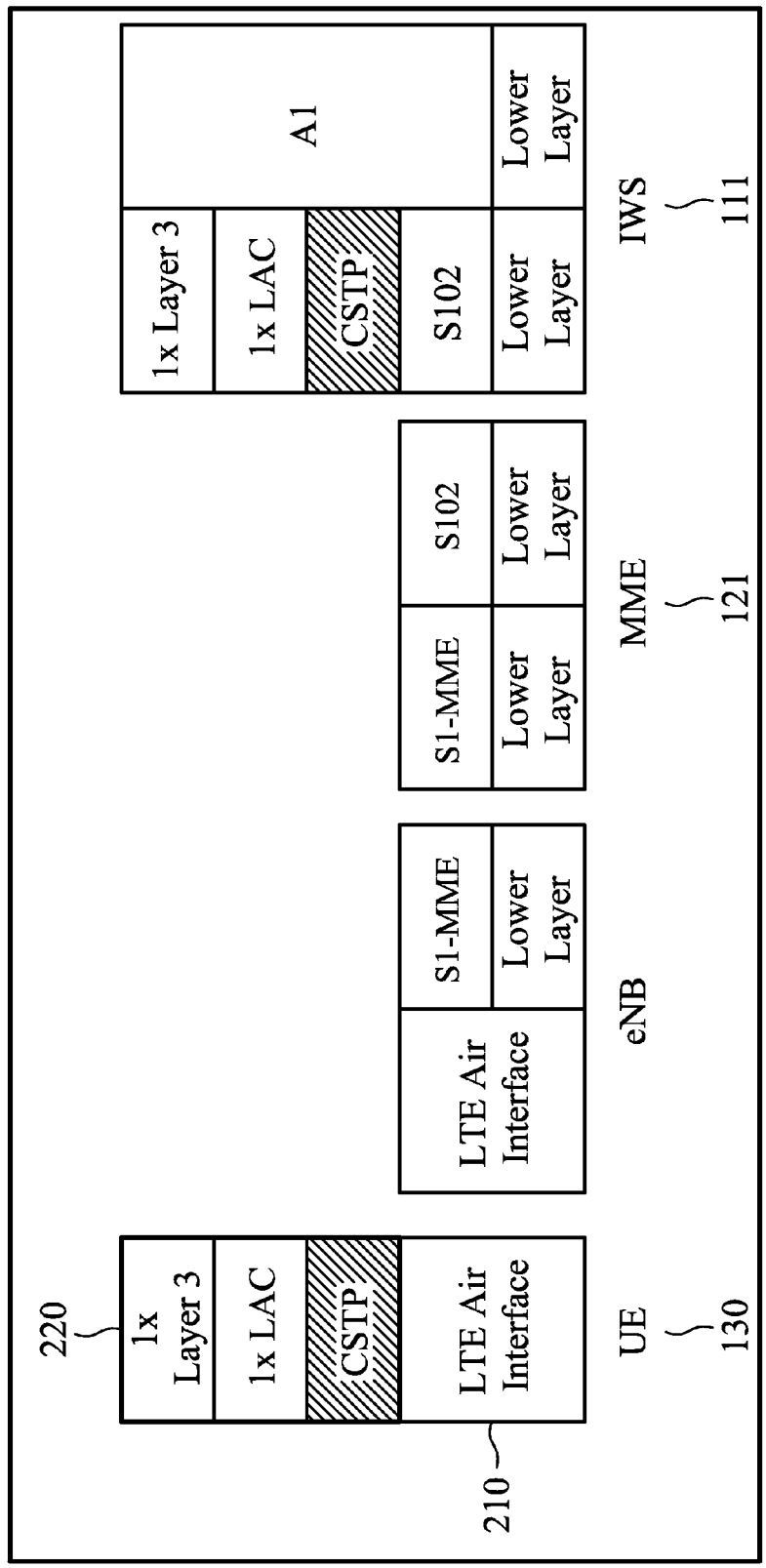
FIG. 2 is a block diagram illustrating the communication protocols in the CSFB architecture according to an embodiment of this present invention.

FIG. 2 is a block diagram illustrating the communication protocols in the CSFB architecture according to an embodiment of this present invention. The UE 130 mainly supports the LTE protocol stack, in which all protocol layers are incorporated in the LTE air interface 210, as shown in FIG. 2. In addition to the LTE air interface 210, the UE 130 also includes the CDMA-2000 CS-domain protocol stack 220. In the CDMA-2000 CS-domain protocol stack 220, the CSTP layer is located between the 1x Link Access Control (1x LAC) layer and the LTE air interface 210, to transmit/receive the 1x LAC encapsulated packet data unit (PDU) carrying the voice data via the communication tunnel 101. Correspondingly, in the protocol stack of the IWS 111, the CSTP is located between the 1x LAC layer and the interface S102. Since a new protocol layer, i.e. the CSTP layer, is added in the protocol stack of the IWS 111, the 1x LAC layer and the interface S102 of the IWS 111 is modified to fit the new protocol layer. The MME 121 in the LTE system 120 is also modified to fit the new protocol layer. Meanwhile, the LTE air interface 210 may include other protocol layers, such as a Non-Access-Stratum (NAS) layer (not shown), a physical layer (not shown), etc. The CDMA-2000 CS-domain protocol stack 220 may include other protocol layers, such as a 1x NAS layer (not shown). For implementation, any protocol stack described herein may be realized by software, hardware, or a combination of both.

Figure 3:
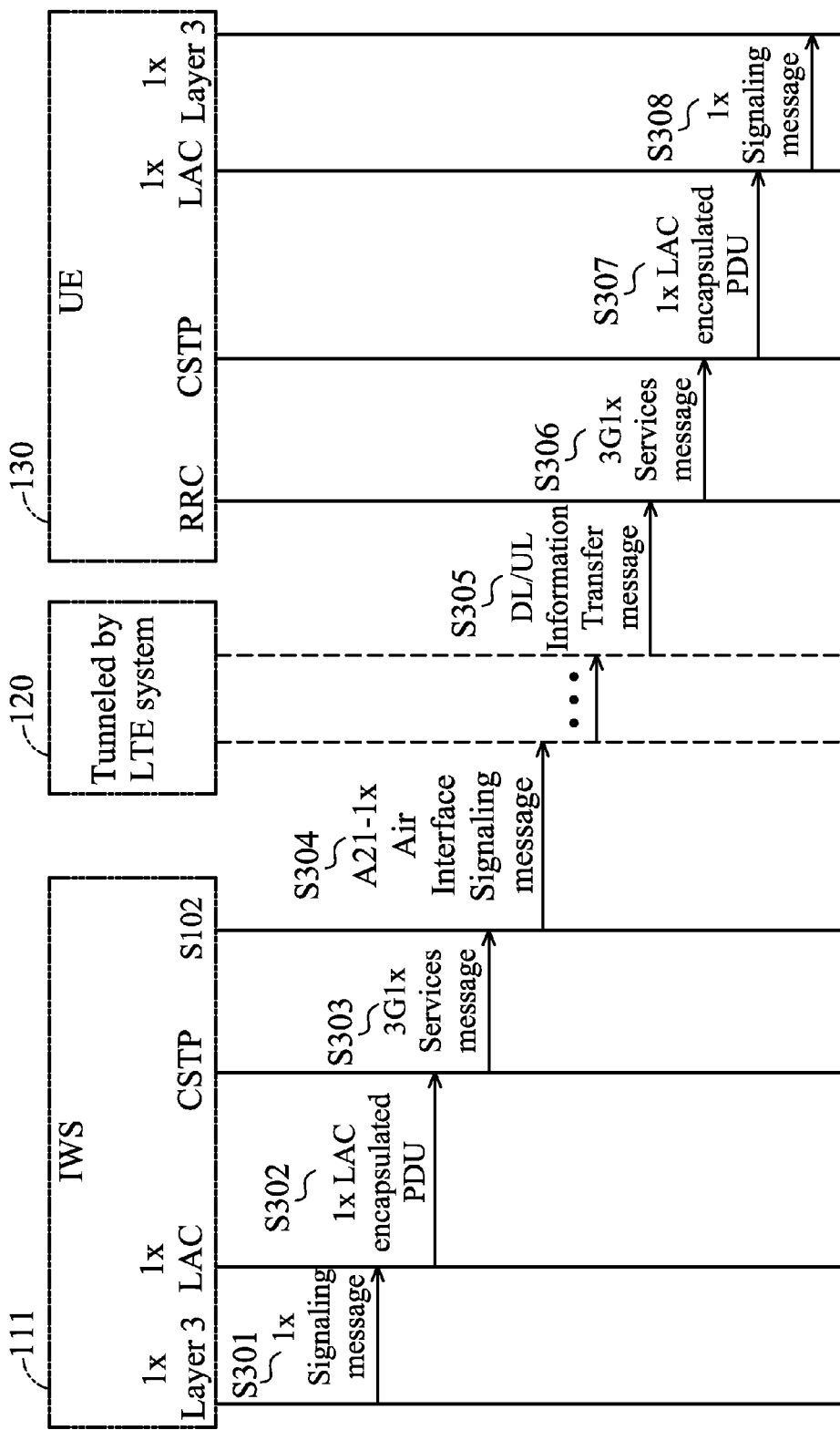
FIG. 3 is a message sequence chart illustrating a circuit server tunneling method in the CSFB architecture according to an embodiment of the invention.

FIG. 3 is a message sequence chart illustrating a circuit server tunneling method in the CSFB architecture according to an embodiment of the invention. When the CDMA-2000 system 110 receives a voice call request that is meant for the UE 130, the 1x layer 3 in the protocol stack of the IWS 111 first transfers a 1x Signaling message to the 1x LAC layer (step S301). The 1x LAC layer in the protocol stack of the IWS 111 then processes and encapsulate the 1x Signaling message in 1x LAC encapsulated PDU(s) and transfers the 1x LAC encapsulated PDU(s) to a CSTP layer (step S302). The CSTP layer uses a 3G1xServices message to carry the 1x LAC encapsulated PDU(s) and transfers the 3G1xServices message to the interface S102 (step S303). After processing the 3G1xServices message, the interface S102 transmits an A21-1x Air Interface Signaling message with the 3G1xServices message to the LTE system 120 via the physical layer (not shown) (step S304). Next, in the LTE system 120, the A21-1x Air Interface Signaling message is processed by other entities, such as the MME 121, the Evolved Universal Terrestrial Radio Access Network (E-UTRAN), etc, and further packaged as a downlink/uplink (DL/UL) Information Transfer message and transmitted to the UE 130 via the LTE air interface 210 (step S305). Subsequently, in the UE 130, the Radio Resource Control (RRC) layer retrieves the 3G1xServices message from the DL Information Transfer message and transfers the 3G1xServices message to the CSTP layer (step S306). The CSTP layer then retrieve the 1x LAC encapsulated PDU(s) from the 3G1xServices message and transfers the 1x LAC encapsulated PDU(s) to the 1x LAC layer (step S307). At last, 1x LAC layer retrieve the 1x Signaling message from the 1x LAC encapsulated PDU(s) and transfers the 1x Signaling message to the 1x layer 3 (step S308). Thus, the UE 130 successfully receives the voice call request from the CDMA-2000 system 110, and proceeds with a voice conversation of the voice call. The CSTP layer and the 3G1xServices message in the invention enables the incorporation of the CDMA-2000 system 110 into the LTE system 120, and the provision of voice services by the LTE system 120 via the CDMA-2000 system 110.

Figure 4:
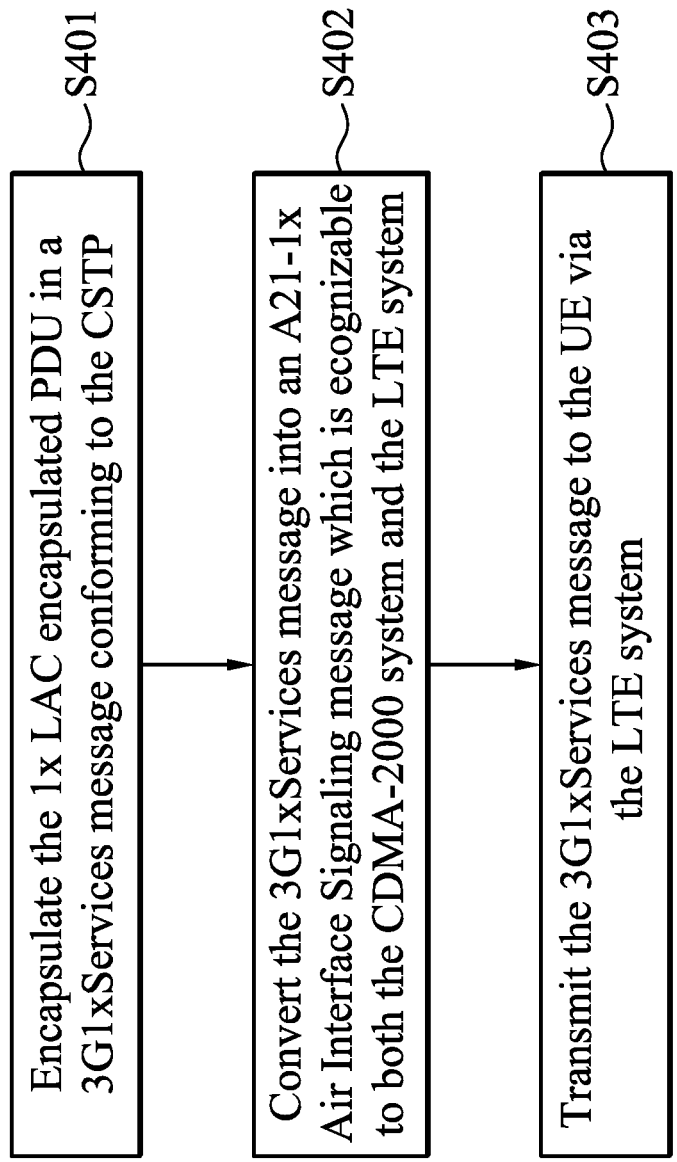
FIG. 4 is a flow chart illustrating a circuit service tunneling method for an interworking system according to an embodiment of the invention.

FIG. 4 is a flow chart illustrating a circuit service tunneling method for an interworking system according to an embodiment of the invention. To begin, the IWS 111 encapsulates the 1x LAC encapsulated PDU(s) in a 3G1xServices message conforming to the CSTP (step S401). The IWS 111 further converts the 3G1xServices message into an A21-1x Air Interface Signaling message which is recognizable to both the CDMA-2000 system 110 and the LTE system 120 (step S402), and transmits the A21-1x Air Interface Signaling message to the LTE system 120. The LTE system 120 then retrieves the 3G1xServices message from the A21-1x Air Interface Signaling message and transmits the 3G1xServices message to the UE 130 (step S403). After receiving the 3G1xServices message, the UE 130 decapsulates the 3G1xServices message according to the CSTP to obtain CS domain service data.

Figure 5:
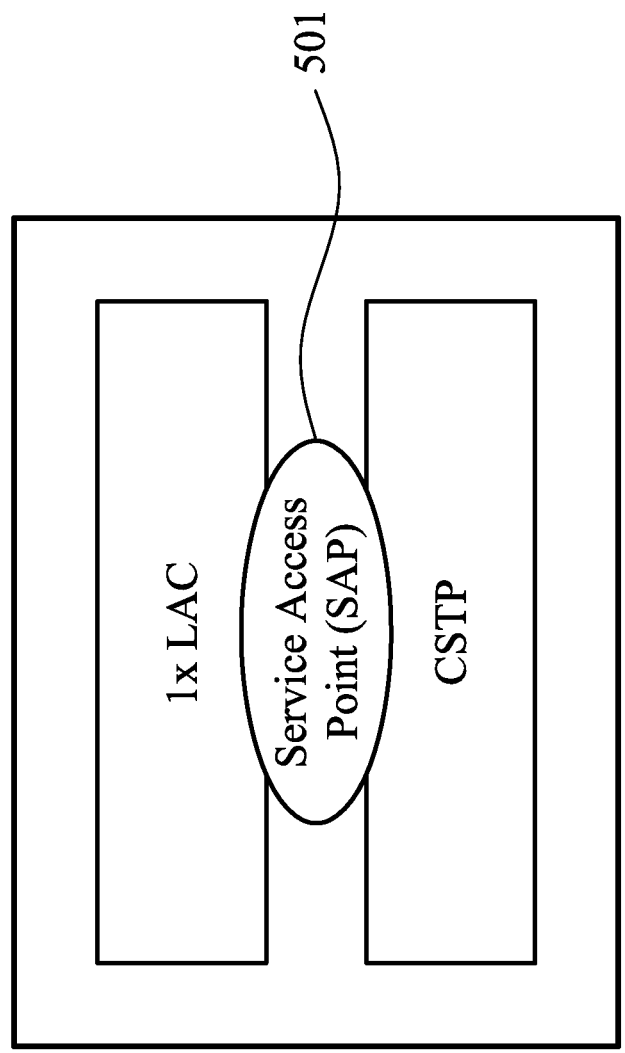
FIG. 5 is a block diagram illustrating a Service Access Point (SAP) between a Circuit Service Tunneling Protocol (CSTP) layer and a 1x LAC layer according to an embodiment of the invention.

For both the UE 130 and the IWS 111, a Service Access Point (SAP) 501 is provided, as shown in FIG. 5, for communications between the CSTP layer and the 1x LAC layer in response to the addition of the CSTP layer. In the SAP 501, interface primitives, such as a CSTP-Data.Request, a CSTP-Data.Indication, a CSTP-SDUReady.Request, a CSTP-Availability.Indication, and CSTP-Failure.Indication, are further defined to exchange the 1x LAC encapsulated PDU(s) and related interface control information between the CSTP layer and the 1x LAC layer. The information of the interface primitives are listed in Table 1 as follows:

TABLE 1

| CSTP-Data.Request | | |
|---|---|---|
| Type | Request | |
| Direction | From the 1x LAC layer to the CSTP layer | |
| Action | To deliver the 1x LAC encapsulated PDU(s) to the CSTP layer | |
| Parameters | logical_channel | The logical channel type, e.g. a dedicated signaling channel (dsch) or a shared signaling channel (csch) |
| | data | The 1x LAC encapsulated PDU(s) |
| | size | The size of the 1x LAC encapsulated PDU(s) |
| CSTP-Data.Indication | | |
| Type | Indication | |
| Direction | From the CSTP layer to the 1x LAC layer | |
| Action | To deliver the received 1x LAC encapsulated PDU(s) to the 1x LAC layer | |
| Parameters | logical_channel | The logical channel type, e.g. a dsch or a csch |
| | data | The 1x LAC encapsulated PDU(s) |
| | size | The size of the 1x LAC encapsulated PDU(s) |
| CSTP-SDUReady.Request | | |
| Type | Request | |
| Direction | From the 1x LAC layer to the CSTP layer | |
| Action | To indicate that there is a 1x LAC encapsulated PDU ready for transmission | |
| Parameters | msg_tag | The message type defined in the Message Control and Status Block (MCSB) |
| | size | The size of the 1x LAC encapsulated PDU |
| CSTP-Availability.Indication | | |
| Type | Indication | |
| Direction | From the CSTP layer to the 1x LAC layer | |

TABLE 1-continued

| | | |
|---|---|---|
| Action | To indicate that the 1x LAC encapsulated PDU can be transferred | |
| Parameters | size | The size of the 1x LAC encapsulated PDU |
| | CSTP-Failure.Indication | |
| Type | Indication | |
| Direction | From the CSTP layer to the 1x LAC layer | |
| Action | To indicate the 1x LAC layer that a certain event preventing a successful transmission has occurred | |
| Parameters | reason | The reason of transmission failure |

In addition to supporting the mentioned interface primitives, the 1x LAC layer of the invention also modifies its utility sublayer by deleting the "Radio Environment Report" field, and further modifies the Segmentation and Reassembly (SAR) sublayer according to the mentioned interface primitives to provide corresponding operations. When in a transmission mode, the SAR sublayer uses a CSTP-SDUReady.Request to indicate that there is a 1x LAC encapsulated PDU ready for transmission. The CSTP layer determines whether to use a CSTP-Availability.Indication according to the parameters in the CSTP-SDUReady.Request. The SAR sublayer waits to use a CSTP-Data.Request to transfer the 1x LAC encapsulated PDU to the CSTP layer until a CSTP-Availability.Indication is received. Then, the CSTP layer transfers the 1x LAC encapsulated PDU to the interface S102 via a 3G1xServices message. The message format of the 3G1xServices message is defined in Table 2 as shown below. When in a reception mode, the SAR sublayer receives the 1x LAC encapsulated PDU from the CSTP layer via a CSTP-Data.Indication, and processes the 1x LAC encapsulated PDU according to the logical channel information indicated in the CSTP-Data.Indication. Regarding the process of the 1x LAC encapsulated PDU, reference may be made to the 3GPP2 C.S0004 specification—"Signaling Link Access Control (LAC) Standard for cdma2000 Spread Spectrum Systems".

TABLE 2

3G1xServices message

| Field | Length (bits) |
|---|---|
| MessageID | 8 |
| MessageSequence | 6 |
| 3G1xLogicalChannel | 1 |
| ProtocolRevision | 8 |
| PDULength | 16 |
| PDU | PDULength *8 |

As shown in Table 2, the "3G1xLogicalChannel" field indicates the logical channel type used by the 3G1xServices message, e.g. a CSCH (common signaling channel) is used when the value of the "3G1xLogicalChannel" field is 0, and a DSCH (dedicated signaling channel) is used when the value of the "3G1xLogicalChannel" field is 1. The "ProtocolRevision" field indicates a protocol level used by the 3G1xServices message. The "PDU" field stores the 1x LAC encapsulated PDU.

In addition to the modifications to the 1x LAC layer as described above, corresponding modifications are made to the interface S102 in IWS 111 and the MME 121. In the A21-1x Air Interface Signaling message, the "1x LAC encapsulated PDU" information element (IE) is modified to a "CSTP PDU" IE, and the "AckRequired" and "3G1xLogicalChannel" fields in the "A21 1x Message Transmission Control" IE are omitted. The message format of the A21-Ack message remains the same as specified in the 3GPP TS 23.272 specification, while the operational procedure of the A21-Ack message is modified. The A21-Ack message is transmitted between the interface S102 in the IWS 111 and the MME 121 to acknowledge the reception of the A21-1x Air Interface Signaling message.

In the invention, an acknowledgement mechanism may be implemented for the message transmissions from the CSTP layer, to ensure the delivery of the transmitted messages. In a case where a transmitted message is not received at a receiving end, the acknowledgement mechanism may enable the retransmission of the transmitted message. Since the IWS 111 is responsible for the transformation between the air interface messages and the A1 interface messages, the processing related to the 1x LAC layer and the 1x layer 3 is easy for the 1x LAC layer. Thus, in one embodiment, the acknowledgement mechanism may be performed in the 1x LAC layer of the IWS 111. The acknowledgement mechanism is further described as follows. At first, the ARQ sublayer sets the "ACK_REQ" and "VALID_ACK" fields in the PDU and transfers the 1x LAC encapsulated PDU to the 1x LAC layer. When the LAC layer receives the 1x LAC encapsulated PDU, the Automatic Repeat-reQuest (ARQ) sublayer in the 1x LAC layer performs the acknowledgement mechanism according to the "ACK_REQ" and "VALID_ACK" fields indicated in the 1x LAC encapsulated PDU. In a case where the value of the "ACK_REQ" filed is set to 1, the ARQ sublayer in the 1x LAC layer performs the acknowledgement mechanism as described above, i.e. the 1x LAC encapsulated PDU is transferred to the CSTP layer to be packaged in a 3G1xServices message and further be transmitted to another entity at the receiving end, and at the receiving end, the another entity retrieves the 1x LAC encapsulated PDU from the 3G1xServices message and transfers the 1x LAC encapsulated PDU to the 1x LAC layer, wherein the ARQ sublayer acknowledges the reception of the 1x LAC encapsulated PDU and then replies with an acknowledgement message to the ARQ sublayer at the transmitting end. Thus, a peer layer acknowledgement mechanism is established in the 1x LAC layers at both the transmitting and receiving ends, so as to concurrently ensure the delivery of the 3G1xServices message.

In another embodiment, the acknowledgement mechanism may be performed in the CSTP layer. In order to implement the acknowledgement mechanism in the CSTP layer, a 3G1xServicesAck message is additionally defined so that the transmitted 3G1xServices message is assured of being successfully received. In response to the addition of the 3G1xServicesAck message, the ARQ sublayer in the 1x LAC layer is required to always set the value of the "ACK_REQ" filed and valid ACK field to 0. Furthermore, a new parameter "delivery_mode" may be added to the CSTP-Data.Request and CSTP-Data.Indication, to indicate if the acknowledgement mechanism should be activated.

It is noted that the principle of the CSTP layer of the invention is to provide a signaling tunnel between mobile service networks of different specifications. Thus, the CSTP layer of the invention may be applied to a Single Radio Voice Call Continuity (SRVCC) architecture, in addition to the CSFB architecture. The difference between the application of the CSTP layer to the CSFB architecture and the SRVCC architecture is that the signaling tunnel used in the CSFB architecture is a shared signaling tunnel while the signaling tunnel used in the SRVCC architecture is a dedicated signaling tunnel. Those skilled in the art should appreciate that the CSTP layer of the invention is not limited to the interconnection between a CDMA-2000 system and an LTE system. The CSTP layer of the invention may be also used for the interconnection between a CDMA-2000 system and other mobile communications system, such as a Worldwide Interoperability for Microwave Access (WiMAX) system, a Wireless Fidelity (WiFi) system, a High Rate Packet Data (HRPD) system, or a CDMA 1x Evolution-Data Optimized (EV-DO) system.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A circuit service tunneling system, comprising:
a first mobile service network providing packet-switched domain services;
a second mobile service network providing circuit-switched domain services, and comprising an interworking system which comprises a circuit-service tunneling protocol and connects to the first and second mobile service networks to enable the first mobile service network to provide the circuit-service domain services via the second mobile service network; and
a user equipment supporting a first communication protocol corresponding to the first mobile service network, a second communication protocol corresponding to a circuit-service domain of the second mobile service network, and the circuit-service tunneling protocol, and connecting to the first mobile service network,
wherein the circuit-service tunneling protocol is used to establish a communication tunnel service between the user equipment and the interworking system via the first mobile service network, and one of the interworking system and the user equipment encapsulates circuit-service domain service data in a circuit-service tunneling message conforming to the circuit-service tunneling protocol and transmits the circuit-service tunneling message to the other of the interworking system and the user equipment, and the other of the interworking system and the user equipment decapsulates the circuit-service tunneling message according to the circuit-service tunneling protocol to obtain the circuit-service domain service data,
wherein the circuit-service tunneling protocol is located under a Link Access Control (LAC) layer in the circuit-service domain of the second mobile service network, so that the delivery of the circuit-service tunneling message is ensured by a layer-to-layer message acknowledging mechanism provided by the LAC layer.

2. The circuit service tunneling system of claim 1, wherein the first mobile service network is a Long Term Evolution system, and the second mobile service network is one of the following:
a Code-Division Multiple-Access 2000 system;
a Code-Division Multiple-Access 1xEvolution-Data Optimized system;
a Worldwide Interoperability for Microwave Access system; and
a High Rate Packed Data system.

3. The circuit service tunneling system of claim 1, wherein the circuit-service tunneling message comprises any combination of the following:
a logical channel indication information indicating that a shared signaling channel or a dedicated signaling channel is being used to transmit the circuit-service tunneling message; and
a protocol revision information indicating that a protocol level is being used for the circuit-service tunneling message.

4. The circuit service tunneling system of claim 1, wherein after receiving the circuit-service tunneling message, the other of the interworking system and the user equipment further transmits a circuit-service tunneling acknowledgement message to inform the one of the interworking system and the user equipment that the circuit-service tunneling message has been received.

5. The circuit service tunneling system of claim 1, wherein the first mobile service network comprises a mobility management entity connected to the interworking system to interconnect the first and second mobile service networks, and the mobility management entity comprises:
a cross-system interface module receiving an air interface message from the interworking system, wherein the air interface message comprises a circuit-service tunneling message that was converted to a first format by the interworking system; and
a mobility management interface module converting the circuit-service tunneling message from the first format to a second format conforming to the mobility management entity and a base station system of the first mobile service network, and transmitting the converted circuit-service tunneling message in the second format to the user equipment via the base station system.

6. A circuit service tunneling method for an interworking system of a first mobile service network providing circuit-switched domain services, wherein the interworking system connects the first mobile service network to a second mobile service network to enable the second mobile service network to provide circuit-service domain services to a user equipment via the first mobile service network, the second mobile service network provides packet-switched domain services, and the user equipment supports a first communication protocol corresponding to a circuit-service domain of the first mobile service network, a second communication protocol corresponding to the second mobile service network, and a circuit-service tunneling protocol (CSTP), comprising:
encapsulating circuit-service domain service data in a circuit-service tunneling message conforming to the CSTP which establishes a communication tunnel service between the user equipment and the interworking system via the second mobile service network;
converting the circuit-service tunneling message into a message format recognizable to the first and second mobile service networks; and transmitting the circuit-service tunneling message in the message format to the user equipment via the second mobile service network, wherein the user equipment decapsulates the circuit-service tunneling message in the message format according to the circuit-service tunneling protocol to obtain the circuit-service domain service data, wherein the CSTP is located under a Link Access Control (LAC) layer in the circuit-service domain of the first mobile service network, so that the delivery of the circuit-service tunneling message is ensured by a layer-to-layer message acknowledging mechanism provided by the LAC layer.

7. The circuit service tunneling method of claim 6, wherein first mobile service network is one of the following:
  a Code-Division Multiple-Access 2000 system;
  a Code-Division Multiple-Access 1xEvolution-Data Optimized system;
  a Worldwide Interoperability for Microwave Access system; and
  a High Rate Packed Data system.

8. The circuit service tunneling method of claim 6, wherein the circuit-service tunneling message includes any combination of the following:
  a logical channel indication information indicating that a shared signaling channel or a dedicated signaling channel is being used to transmit the circuit-service tunneling message; and
  a protocol revision information indicating that a protocol level is being used for the circuit-service tunneling message.

9. The circuit service tunneling method of claim 6, further comprising receiving a circuit-service tunneling acknowledgement message from the user equipment indicating that the circuit-service tunneling message has been received, and decapsulating another circuit service tunneling message from the user equipment according to the circuit service tunneling protocol to obtain associated circuit-service domain service data therein.

10. The circuit service tunneling method of claim 6, wherein the second mobile service network comprises a mobility management entity connected to the interworking system to interconnect the first and second mobile service networks, and the circuit service tunneling method further comprises:
  transmitting to the mobility management entity an air interface message comprising a circuit-service tunneling message that was converted to a first format by the interworking system,
  wherein the mobility management entity converts the circuit-service tunneling message from the first format to a second format conforming to the mobility management entity, and transmits the converted circuit-service tunneling message to the user equipment via a base station system of the second mobile service network.

11. A mobility management entity, located in a first mobile service network and connected to an interworking system in a second mobile service network to interconnect the first and second mobile service networks and enable the first mobile service network to provide circuit-service domain services via the second mobile service network, wherein the first mobile service network provides packet-switched domain services and the second mobile service network provides the circuit-service domain services, comprising:
  a cross-system interface module receiving an air interface message from the interworking system, wherein the air interface message comprises a circuit-service tunneling message that was converted to a first format by the interworking system; and
  a mobility management interface module converting the circuit-service tunneling message from the first format to a second format conforming to a base station system of the first mobile service network, and transmitting the converted circuit-service tunneling message in the second format to the user equipment via the base station system;
  wherein the circuit-service tunneling message includes any combination of the following:
  a logical channel indication information indicating that a shared signaling channel or a dedicated signaling channel is being used to transmit the circuit-service tunneling message; and
  a protocol revision information indicating that a protocol level is being used for the circuit-service tunneling message.

12. The mobility management entity of claim 11, wherein the cross-system interface module further transmits a circuit-service tunneling acknowledgement message to inform the interworking system that the air interface message has been received.

13. A circuit service tunneling system, comprising:
  a first mobile service network providing packet-switched domain services;
  a second mobile service network providing circuit-switched domain services, and comprising an interworking system which comprises a circuit-service tunneling protocol and connects to the first and second mobile service networks to enable the first mobile service network to provide the circuit-service domain services via the second mobile service network; and
  a user equipment supporting a first communication protocol corresponding to the first mobile service network, a second communication protocol corresponding to a circuit-service domain of the second mobile service network, and the circuit-service tunneling protocol, and connecting to the first mobile service network,
  wherein the circuit-service tunneling protocol is used to establish a communication tunnel service between the user equipment and the interworking system via the first mobile service network,
  wherein the circuit-service tunneling protocol is located under a Link Access Control (LAC) layer in the circuit-service domain of the second mobile service network, so that the delivery of the circuit-service tunneling message is ensured by a layer-to-layer message acknowledging mechanism provided by the LAC layer.

* * * * *